(12) United States Patent
Gorbatovsky

(10) Patent No.: US 7,809,626 B2
(45) Date of Patent: Oct. 5, 2010

(54) PORTFOLIO OPTIMIZATION

(76) Inventor: Dmitry Gorbatovsky, 5/22 Nordau Street, 77221 Ashdod (IL)

( * ) Notice: Subject to any disclaimer, the term of this patent is extended or adjusted under 35 U.S.C. 154(b) by 410 days.

(21) Appl. No.: 11/794,636

(22) PCT Filed: Feb. 20, 2005

(86) PCT No.: PCT/IL2005/000209

§ 371 (c)(1),
(2), (4) Date: Jul. 15, 2009

(87) PCT Pub. No.: WO2005/079157

PCT Pub. Date: Sep. 1, 2005

(65) Prior Publication Data

US 2010/0017338 A1 Jan. 21, 2010

Related U.S. Application Data

(60) Provisional application No. 60/545,506, filed on Feb. 19, 2004.

(51) Int. Cl.
*G06Q 40/00* (2006.01)
(52) U.S. Cl. .................. 705/36 R; 705/37
(58) Field of Classification Search .......... 705/36 R–37
See application file for complete search history.

(56) References Cited

U.S. PATENT DOCUMENTS

| 5,784,696 A | 7/1998 | Melnikoff |
| 6,021,397 A | 2/2000 | Jones et al. |

*Primary Examiner*—Thu Thao Havan
(74) *Attorney, Agent, or Firm*—Carter, DeLuca, Farrell & Schmidt, LLP

(57) ABSTRACT

A method for comparing, creating and optimizing investment portfolios is provided. The utility function for an investment is characterized, and the optimization problem for the utility function is stated based on investor preferences and risk tolerance. According to one embodiment, the measure of relative performance of investment portfolios is calculated based on the investor utility function. According to another embodiment, guidelines for generating an optimized portfolio for the investor from the plurality of asset classes available, are mapped out.

21 Claims, 15 Drawing Sheets

PORTFOLIO OPTIMIZATION

CROSS REFERENCE TO RELATED APPLICATIONS

This application claims priority to International Patent Application PCT/IL05/00209, filed on Feb. 20, 2005, which claims priority to U.S. Provisional Patent Application No. 60/545,506, filed on Feb. 19, 2004, the entire disclosures of each of which are incorporated by reference herein.

FIELD OF THE INVENTION

The present invention deals with investments in general, and, in particular, with the evaluation of the relative performance of portfolios.

BACKGROUND OF THE INVENTION

Investors are individuals, with unique personal and economic requirements and profiles, which affect their need for cash and their risk tolerance. Since every investment vehicle has its own characteristics, such as earnings, dividends, growth potential, volatility, safety, and the like; it should be possible, in principle, to construct a portfolio that is tailored to any given individual investor's needs. The problem investors face is to find some rational, systematic method of selecting this portfolio from the plurality of investment vehicle classes and the virtually endless individual investment vehicles available.

Historically, investment choices have been difficult for the typical individual investor, particularly in that investors typically wish to invest in a number of different investment vehicles for purposes of diversification but have a limited amount of funds to invest. The problem is exacerbated by the fact that most individual investors have neither the understanding nor the resources to properly gauge the risk of and prospective return on investments.

If investment in stocks is taken as illustrative of the general problem posed above, the advent of stock mutual funds in recent years has made it substantially easier for individual investors to achieve the goal of diversification on a limited budget. However, here, too, the proliferation of mutual funds and the broad range of mutual fund types and categories, again leaves the individual investors with the daunting task of evaluating and comparing the various funds available for investment, particularly from the standpoint of return and risk, in light of their personal investment profiles.

Accordingly, a readily understandable method for appropriately evaluating the returns and risks of individual investment portfolios would be exceedingly desirable for individual investors.

To proceed further, the meaning of two key concepts need be clarified: risk and volatility. They are often used interchangeably, although they differ significantly.

"Risk" indicates a possibility of an undesirable event or outcome and further implies the possibility of loss. Investment risk is thus characterized as a strictly downside concept. On the other hand, "volatility" is a measure of the variability of results in either direction, both upside and downside. While it appears that theses two concepts are related, the exact nature of the relationship between them is not simple.

As is known to those familiar with the art, there are two primary approaches to looking at investment risk:

1. Modern Portfolio Theory (MPT) of Markovitz bases the measure of risk on the volatility of return on investment, which is defined as the statistically evaluated standard deviation of the return. In particular, the notion of $\beta$ is introduced, which is defined as the volatility of an individual security relative to that of some predefined measure such as well-diversified portfolio (e.g., the Standard and Poor's 500 Index, the Russell 2000 index) or some other broad based index.

2. The approach developed by Morningstar Inc, a financial publishing service, bases the measure of risk on shortfall of performance of a mutual fund by comparing return to that of three-month Treasury Bill as a baseline or standard. The relative shortfall is calculated on a monthly basis for the period, typically three or five years, being analyzed, with only shortfalls or negative results being taken into account. The monthly results are averaged to provide a risk statistic for the fund.

Both approaches suffer from a number of limitations, most notably in both cases that they are not readily understandable by the typical individual investor.

Different measures of comparison of portfolio performance have been proposed based on the above two approaches; such as the indexes of Sharpe, Treynor, Jensen, etc. These indexes however, in addition to their technical limitations, in each case suffer from the shortcomings of the risk measure used.

An approach that has been used for evaluating portfolios has been Mean Variance Portfolio Theory of Markovitz, wherein a good portfolio is a portfolio which has maximum expected return $E(r)$, which is the measure of the reward for the portfolio, and minimum standard deviation of return $Std(r)$, which is the measure of risk for the portfolio. This definition leads to the obvious procedure to find set of portfolios for which we have maximum $E(r)$ and minimum $Std(r)$ simultaneously. These are called "efficient portfolios" and asset of such portfolios constitute so called "efficient frontier." According to this methodology investor should somehow choose his portfolio from the set of "efficient portfolios." This approach, which is mathematically indisputable, leaves the investor with an ambiguous decision tool. The investor is expected to somehow map his investment priorities to the Markovitz proposed measurements of risk and reward, or at least compare different investment options according to the Markovitz criteria in order to decide which is better.

U.S. Pat. No. 5,784,696 to Melnikoff, included herein by reference, discloses "Methods and apparatus for evaluating portfolios based on investinent risk" or more specifically, based on risk and risk-adjusted return of investments. In the Background of the Invention section, Melnikoff provides more detailed explanations of the basis and the limitations of the MPT and Morningstar approaches mentioned hereinabove. He then contends to teach an iterative method for an investor to select an investment portfolio from a library of assets by evaluating risk-adjusted portfolio performance, including some accounting of investment costs, taxes, and the investor's risk aversion. However, he uses a non-standard approach to risk and evaluation that does meet his goal of understandability to the individual investor.

U.S. Pat. No. 6,021,397 to Jones et al. discloses a "Financial advisory system" with similar goals that simulates returns of a plurality of asset classes and financial products in order to produce optimized portfolios. Attempt is made to take into account constraints on the set of financial products available to the individual investor, as well as the investor's financial goals and risk aversion. Here, too, risk is defined in a non-standard and non-intuitive way that does not provide the individual investor with clear or unambiguous means for making investment decisions.

SUMMARY OF THE INVENTION

The present invention seeks to provide a method for comparing, creating and optimizing investment portfolios for an individual investor that is readily understandable to the individual investor, taking into account the investor's investment objectives and risk tolerance, employing measures of risk that, too, are readily understandable to the individual investor. A further objective of the present invention is to provide guidelines for generating an optimized portfolio for the individual investor from a plurality of asset classes available to the investor.

There is thus provided, in accordance with a preferred embodiment of the invention, a method for evaluating the suitability of a set of investment assets for an individual investor, including the steps of:

assessing an individual investor's risk tolerance;

representing the risk tolerance in the form of two risk tolerance parameters, namely: the minimum tolerated value of the individual investor's investment and the maximum allowed time to recoup the individual investor's investment;

obtaining the individual investor's reward expectation, namely: the expected rate of return on the individual investor's investment;

determining types of investment assets the individual investor wishes to consider;

selecting a representation for the behavior of the considered types of investment assets, which is either a theoretical, parametrical model based on geometrical Brownian motion of prices of investment assets or a non-parametrical statistical simulation based on statistically processed historical data for the prices of investment assets;

calculating statistically viable frontier values of the risk tolerance parameters and the reward expectations of the specific investment assets based on the selected representation;

deriving values for the risk tolerance parameters and the reward expectation for a set of investment assets from the statistically viable frontier values of the risk tolerance parameters and the reward expectations of the specific investment assets;

comparing the derived values for said risk tolerance parameters with those representing the individual investor's risk tolerance and the derived value for the reward expectation with the individual investor's reward expectation; and deciding if the set of investment assets is suitable for the individual investor.

Further in accordance with a preferred embodiment of the invention, in the step of selecting, the statistical simulation is generating a distribution of a time series of historical data for the prices of investment assets as a stochastic variable with an unknown distribution. In the generated distribution, a predetermined initial percentile thereof; namely, the first percentile; is said minimum tolerated value of the individual investor's investment, a predetermined second percentile thereof; namely, the fifth percentile; is said maximum allowed time to recoup the individual investor's investment, and a predetermined third percentile thereof; namely, the fiftieth percentile; is said expected rate of return on the individual investor's investment.

There is further provided, in accordance with a additional preferred embodiment of the invention, a method of choosing an investment portfolio, which is a set of preselected investment assets from a set of types of investment assets, wherein each preselected investment asset is a predetermined fraction of the portfolio for an individual investor from the preselected set of types of investment assets, including the steps of:

assessing an individual investor's risk tolerance;

representing the risk tolerance in the form of two risk tolerance parameters, namely: the minimum tolerated value of the individual investor's investment and the maximum allowed time to recoup the individual investor's investment;

obtaining the individual investor's reward expectation, namely: the expected rate of return on the individual investor's investment;

determining types of investment assets the individual investor wishes to consider;

selecting a representation for the behavior of the considered types of investment assets, namely, a theoretical, parametrical model based on geometrical Brownian motion of prices of investment assets;

calculating statistically viable frontier values of the risk tolerance parameters and the reward expectations of the specific investment assets based on the selected representation;

generating a multiplicity of portfolios of investment assets from the considered types of investment assets, possibly including portfolios employing leverage;

deriving values for the risk tolerance parameters and the reward expectation for the multiplicity of portfolios of investment assets from the statistically viable frontier values of the risk tolerance parameters and the reward expectations of the specific investment assets;

formulating an optimization problem, which may include weighting to account for the general economic climate, over the multiplicity of portfolios of investment assets, possibly further including weighting to account for preselected fundamental parameters thereof, of the comparison of the derived values for the risk tolerance parameters of the multiplicity of portfolios of investment assets with those representing the individual investor's risk tolerance and the statistically viable frontier values of the reward expectations of the multiplicity of portfolios of investment assets with the individual investor's reward expectation;

comparing the derived values for the risk tolerance parameters with those representing the individual investor's risk tolerance and the derived value for the reward expectation of the portfolio with the individual investor's reward expectation; and solving the optimization problem to recommend an optimized portfolio of investment assets to the individual investor.

BRIEF DESCRIPTION OF THE DRAWINGS

The present invention will be more fully understood and appreciated from the following detailed description taken in conjunction with the drawings, in which.

DETAILED DESCRIPTION OF THE INVENTION

Inherent in every investment is a certain degree of risk. When investing in risky assets, an individual investor naturally expects the investment to yield some gain or return in excess of his initial investment at some later desired time. One risk is that of not being able to retrieve even the initial investment without waiting until some later time. Another risk is that the investor may have to liquidate the investment at some time earlier than desired time, when the investment is worth less than the initial investment. Balancing these risk factors is the reward of an increase or gain in the value of the investment that the investor hopes to achieve.

The success of rational individual investors at achieving their investment goals can be characterized by a Utility Function, U, which is dependent on three parameters: two measures of the risk and one measure of the expected reward; namely:

$T_r$ Recoupment Time or payback period. This is a maximum period after which an investor can expect, to a predefined level of certainty, a portfolio value that is no less than its initial value, and that may possibly be higher than an initial value plus some predetermined profit. The effect of inflation may also be included in the portfolio value.

$V_m$ Minimum Value. This is the minimum value of a portfolio throughout the entire investment period, guaranteed to a predefined level of certainty.

$R_e$ Expected Return. This is a predefined measure of gain or profit, usually expressed as an average annual percentage return, to a predefined level of certainty, over the investment period.

Figure 1:
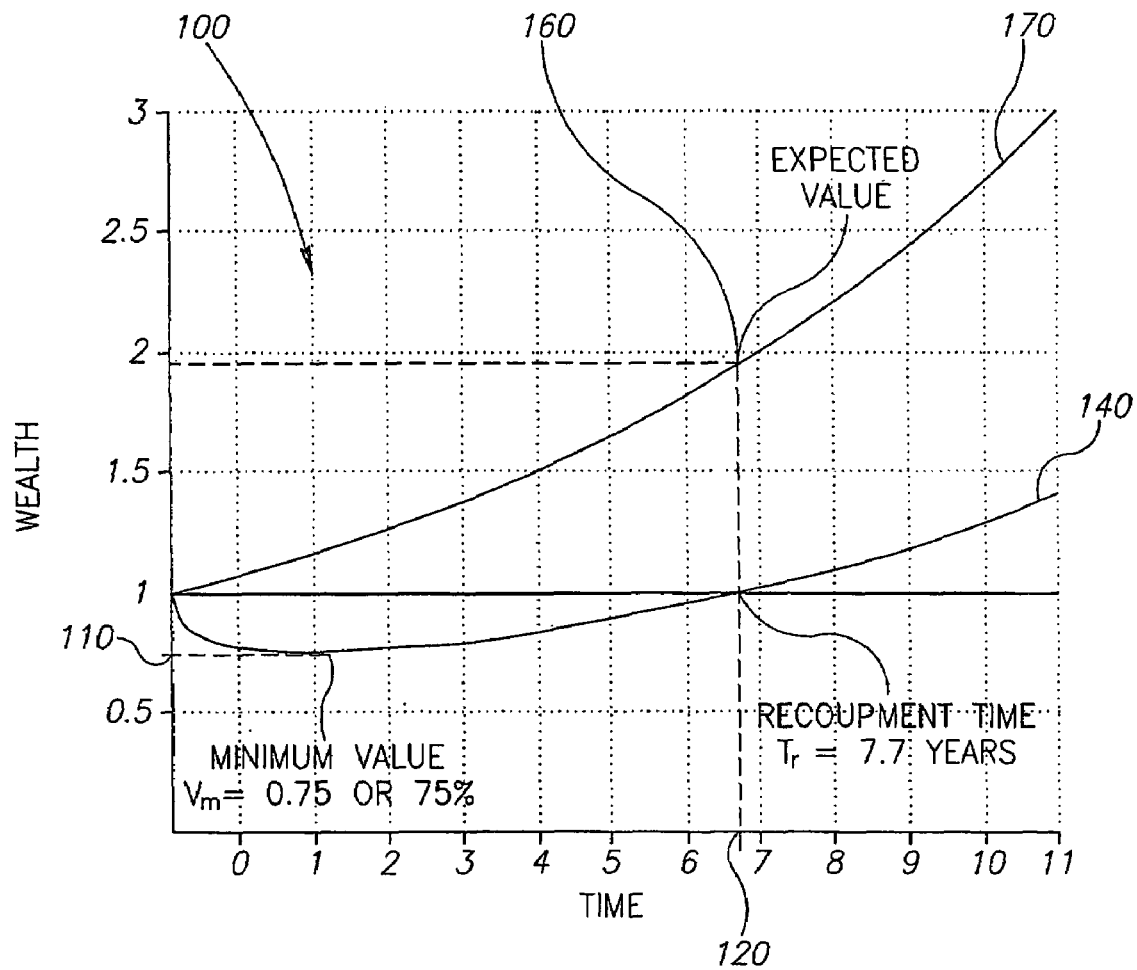
FIG. 1 is a graphic representation of the behavior, to a confidence level of 95%, of the Wealth Curve, for an arbitrary or generic investment.

Referring now to FIG. 1, there is shown a graphic representation, referred to generally as 100, of the behavior, to a confidence level of 95%, of the Wealth or Value Curve, based on an initial value of one, for an arbitrary or generic investment with a positive long-term expectation or drift, which may include one or more investment assets, as a function of time or of the period over which the investment is held. The lower curve is the lower bound 140 of Wealth curve, to a confidence level of 95%, which never falls below Minimum Value $V_m$ 110 and returns to its initial value after Recoupment Time $T_r$ 120. The upper curve is the expected Wealth 170, which increases at a constant rate of return $R_e$. In the limit of long times, Wealth lower bound curve 140 would approach expected Wealth curve 170, in slope, $R_e$. As is known to those familiar with the art, the expected value 160 of expected Wealth curve 170 at Recoupment Time $T_r$ 120 is considered representative of the desired final value sought by the typical investor for the investment.

Thus, the process of advising the investor is typically one of first assessing and quantifying the risk tolerance and desired reward or gain of the investor and then finding an investment or portfolio that. Accordingly, we define investor's utility function as $U(R_e, V_m, T_r)$, where $R_e$ is an expected return, $V_m$ is an expected minimum portfolio value, and $T_r$ is a maximum expected Recoupment Time, all as explained hereinabove.

The required parameters will either be directly supplied by the investor or will be derived from a suitable investor assessment interview or questionnaire. Then, a recommended investment can be sought that can be expected to behave correspondingly. Based on the above, the investor's risk tolerance and desired reward will be characterized by the following:

1. Maximum investment time, $T_{max}$, is a maximum period that investor agrees to wait until the value of the portfolio will reach at least a predetermined desired value with a predetermined degree of certainty. Another way to express this is to consider the maximum time that the investor is willing not to have access to the funds invested. As explained hereinabove, The maximum investment time, $T_{max}$, and the Recoupment Time, $T_r$, are comparable wherein, for an investment suitable for the typical investor, the Recoupment Time, $T_r$, is based on the lower bound of the Wealth curve and the maximum investment time, $T_{max}$, is based on an expected Wealth curve having a constant rate of return so that at the end of the period $T_{max}$, the portfolio will achieve the predetermined desired value.

Example: If $T_{max}$ is five years, the investor expects with a predetermined degree of certainty that in five years the value of the portfolio will be at least a predetermined value.

2. Minimum investment value, $V_{min}$, is a minimum value of the investment, in total amount or in percentage of the starting investment, that the investor is willing to tolerate during the period of the investment, to within a predetermined degree of certainty.

Example: If the $V_{min}$ is $1000 or 75%, the investor expects that, to within a predetermined degree of certainty, the value of the portfolio will never fall below $1000 or 75% of the initial investment.

3. Expected return, $R_e$, is the average expected percentage return per year. It may be considered the lowest average rate of return the investor would expect to receive.

Example: If the $R_e$ is 5% per year, the investor expects, with a predetermined degree of certainty, that in five years the value of the portfolio will be at least 27% higher than the initial investment, i.e., compounding the 5% return over the five years.

4. Predetermined degree of certainty, α, is the probability α that the investment parameters will be in a certain range. In most cases, a value of α≧0.95 will yield meaningful results, and that value will be used for the calculations hereinbelow.

In order to apply the method of the present invention, the behavior of the investment or portfolio must be characterized in a suitable fashion. As is known to those familiar with the art, there are two well-known and accepted approaches. The first is a parametrical model for asset price behavior, and the second is a non-parametrical simulation or bootstrapping based on Monte Carlo resampling of historical price data for the asset or portfolio.

Parametrical Approach.

The most widely accepted model for stock price movement is the geometric Brownian motion model (see, Roberts 1959, Osborn 1959, and Samuelson 1965). For asset price, S, the incremental change in time, t, is given by $$dS = \mu S dt + \sigma S dW_t \quad (1)$$

where μ is a constant drift rate expressed as a percentage of asset price, S, σ is a constant volatility also expressed as a percentage of asset price, S, and $W_t$ is a Weiner process, for which, it is known, the most common example is Brownian motion (i.e., a random walk process with random step sizes).

This has a well-known solution, attributed to Ito, $$S_t = S_0 e^{\sigma W_t + \left(\mu - \frac{\sigma^2}{2}\right)t} \quad (2)$$

where $S_0$ is the initial value of S and $S_t$ is the value at time t. Based on the known properties of the Normal distribution, N(μ, σ), it is exact to say that ln $$\left(\frac{S_{t+\Delta t}}{S_t}\right)$$

is normally distributed with a mean value of $$\left(\mu - \frac{\sigma^2}{2}\right)\Delta t$$

and a variance equal to $\sigma^2 \Delta t$.

We can write lower bound for such a process with the appropriate percentile for the confidence level as $$S_t = S_0 e^{\left(\mu - \frac{\sigma^2}{2}\right)t - \eta\sigma\sqrt{t}} \quad (3)$$

where $S_t$ is expected price for the asset or portfolio at time t, μ is the expected drift rate, σ is the expected standard deviation, and η is the value derived from the normal cumulative distribution function (cdf) for the confidence interval. For example, for the 95% confidence level used in these calculations, η assumes a value of 1.65.

Figure 2:
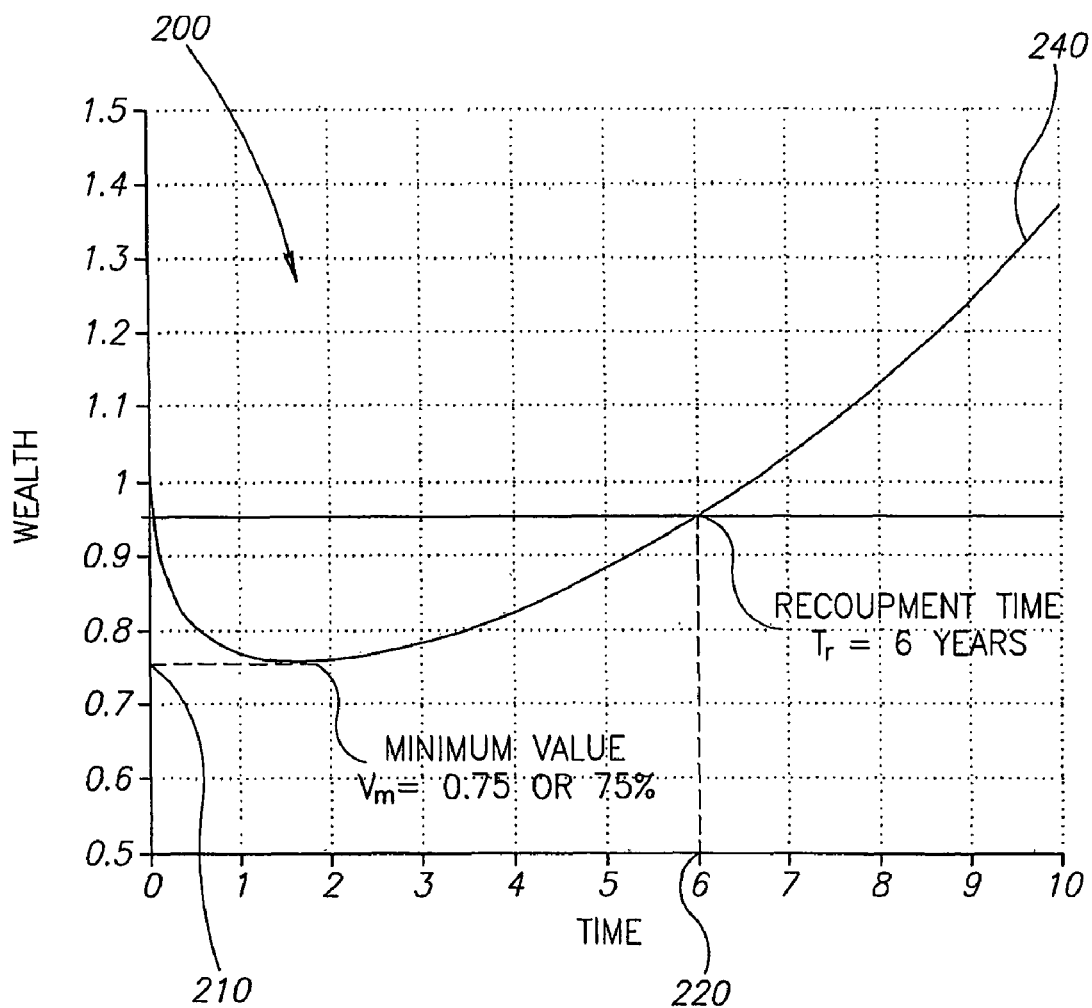
FIG. 2 is a graphic representation of the behavior, to a confidence level of 95%, of the lower bound of the Wealth Curve, for an arbitrary or generic investment with a $\mu$ of 12% and a $\sigma$ of 20%.

Referring now to FIG. 2, there is shown a graphic representation, referred to generally as 200, of the behavior, to a confidence level of 95%, of the lower bound of the Wealth or Value Curve, based on an initial value of one, for an arbitrary or generic investment with a μ of 12% and a σ of 20%. The lower bound 240 of Wealth curve according a geometric Brownian motion model, to a confidence level of 95% never falls below Minimum Value $V_m$ 210 and returns to its initial value after Recoupment Time $T_r$ 220.

Based on the above solution for the behavior of S, the Expected Return, $R_e$, of the investment is given by $$R_e(\mu, \sigma, \eta, t) \approx N\left(\mu - \frac{\sigma^2}{2}, \frac{\eta\sigma}{\sqrt{t}}\right) \simeq \mu - \frac{\sigma^2}{2} \quad (4)$$

This Expected Return, $R_e$, on the investment is a compounded return which the investor can reasonably expect to achieve, on the average, in time.

From equation 3, the expected compounded return from the time Δt is given by $$S^{R_e \Delta t} = S_0 e^{\left(\mu - \frac{\sigma^2}{2}\right)\Delta t - \eta\sigma\sqrt{\Delta t}} \quad (5)$$

such that, for long times approximating infinity, the expected return asymptotically approaches a value of $$\mu - \frac{\sigma^2}{2}, \text{ i.e., } \lim_{\Delta t \to \infty}\left(\left(\mu - \frac{\sigma^2}{2}\right)\Delta t - \eta\sigma\sqrt{\Delta t}\right) = \mu - \frac{\sigma^2}{2} \quad (6)$$

Therefore, for a long-term investment, we can calculate $R_e$ as $$\mu - \frac{\sigma^2}{2},$$

while for a short-term investment, we have to treat $R_e$ as a normally distributed variable $$R_e = N\left(\mu - \frac{\sigma^2}{2}, \frac{\eta\sigma}{\sqrt{t}}\right).$$

Figure 3:
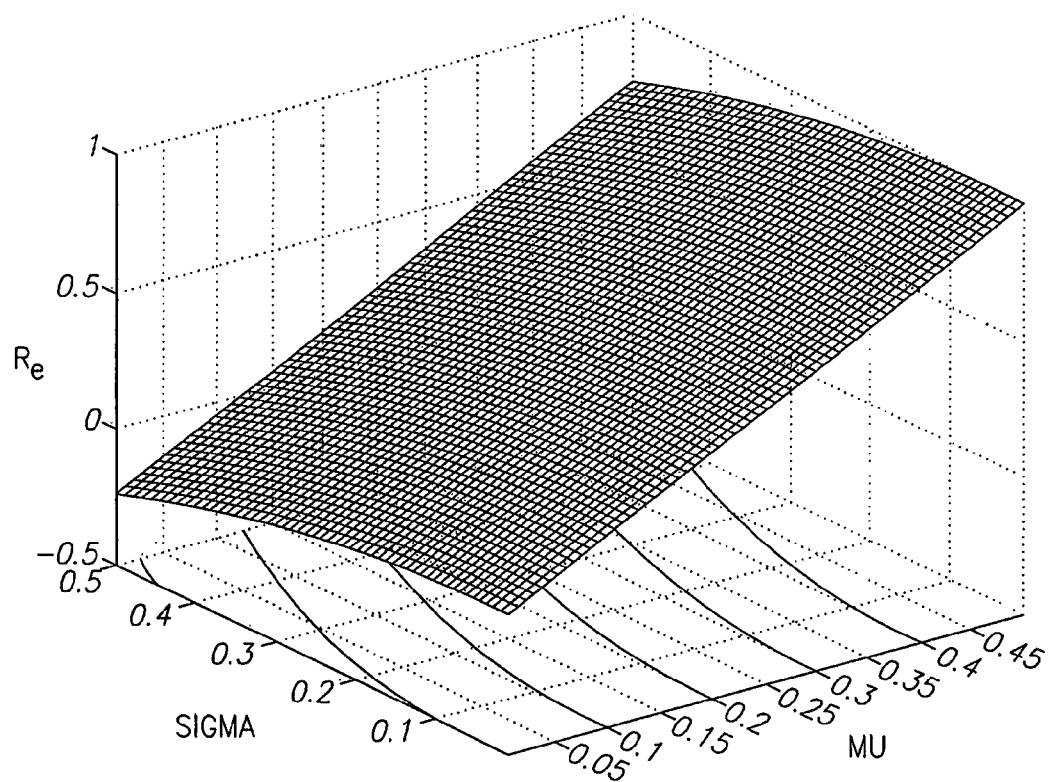
FIG. 3 is a graphic representation of the lower bound of the Expected Return on the investment as a function of μ and σ, to a confidence level of 95%.

The lower bound of the Expected Return, $R_e$, on the investment, to a confidence level of 95%, as a function of μ and σ, according to the model expressed in equation 1, is shown in FIG. 3.

Continuing with the model, the Minimum Value, $V_m$, of the investment is given by $$V_m = e^{\left[\left(\mu - \frac{\sigma^2}{2}\right)\frac{\eta^2\sigma^2}{(2\mu-\sigma^2)^2} - \eta\sigma\left(\frac{\eta^2\sigma^2}{(2\mu-\sigma^2)^2}\right)^{\frac{1}{2}}\right]} \quad (7)$$

This Minimum Value of the investment is found by taking the portfolio price given in equation 3 and setting the first derivative of the function to zero, i.e., $$V_m = S\left(\frac{dS}{dt} = 0\right).$$

By differentiating equation 3, we find that $$\frac{dS}{dt} = \left(\mu - \frac{\sigma^2}{2} - \frac{\sigma\eta}{2\sqrt{t}}\right) e^{\left(\mu - \frac{\sigma^2}{2}\right)t - \eta\sigma\sqrt{t}}$$

considering the point where $$\frac{dS}{dt} = 0,$$

we have $$\left(\mu - \frac{\sigma^2}{2} - \frac{\sigma\eta}{2\sqrt{t_{V_m}}}\right) e^{\left[\left(\mu - \frac{\sigma^2}{2}\right)t_{V_m} - \eta\sigma\sqrt{t_{V_m}}\right]} = 0 \quad (8)$$

Equation 8 can be solved for $t_{V_m}$, the time when $S_t$ assumes its minimum value, namely $$t_{V_m} = \frac{\eta^2\sigma^2}{(2\mu - \sigma^2)^2}$$

and the minimum value, $V_m$, is given by $$V_m = S(t_{V_m}) = e^{\left[\left(\mu - \frac{\sigma^2}{2}\right)\frac{\eta^2\sigma^2}{(2\mu-\sigma^2)^2} - \eta\sigma\left(\frac{\eta^2\sigma^2}{(2\mu-\sigma^2)^2}\right)^{\frac{1}{2}}\right]}. \quad (9)$$

Figure 4:
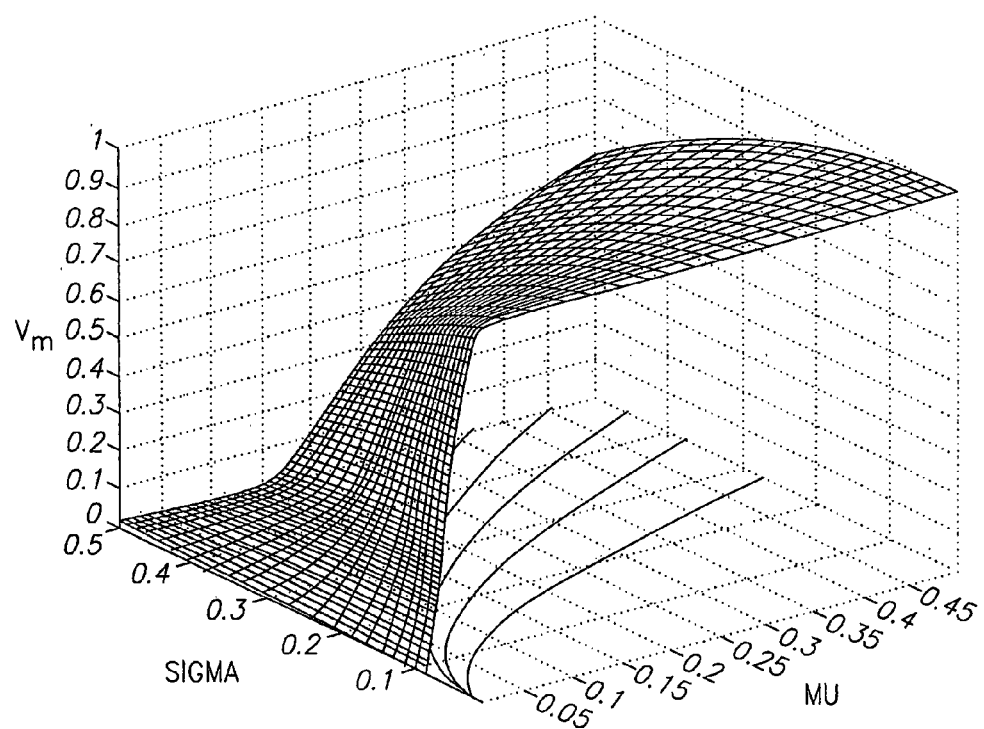
FIG. 4 is a graphic representation of the lower bound of the Minimum Value of the investment as a function of μ and σ, to a confidence level of 95%.

The Minimum Value, $V_m$, of the investment, to a confidence level of 95%, as a function of $\mu$ and $\sigma$, according to the model expressed in equation 1, is shown in FIG. 4.

Further continuing with the model, the Recoupment Time, $T_r$, which is the time when the investor can reasonably expect the wealth or portfolio price, $S_{T_r}$, to equal at least the initial value of the investment, $S_0$, to the chosen confidence level of 95%. As discussed hereinabove, this time is comparable to the time when the investor can reasonably expect the wealth or portfolio price to reach the initial value with the addition of some profit or return, which can be expressed as a constant, risk-less rate of return, R, again to the chosen (95%) confidence level, adding a factor of $S_0 e^{RT_r}$ to equation 2. Accordingly, the Recoupment Time, $T_r$, is given by $$T_r = \frac{4\eta^2\sigma^2}{(2\mu - \sigma^2 - 2R)^2} \quad (10)$$

By the above definition of R, $T_r = t(S = S_{T_r})$, where $S_{T_r}$ is an expected portfolio price or value at time $T_r$, so that $S_{T_r} = S_0 e^{RT_r}$, where R is a constant, risk-less rate of return, which may be zero. Applying equation 2, $S_{T_r}$ is given by $$S_{T_r} = S_0 e^{RT_r} \quad (11)$$

$$= e^{\left[\left(\mu - \frac{\sigma^2}{2}\right)T_r - \eta\sigma\sqrt{T_r}\right]} \Rightarrow \left(\mu - \frac{\sigma^2}{2}\right)T_r - \eta\sigma\sqrt{T_r} - RT_r$$

$$= 0$$

This equation can now be solved for $T_r$ to yield:

$$\left(\mu - \frac{\sigma^2}{2} - R\right)T_r - \eta\sigma\sqrt{T_r} = 0 \Rightarrow T_r = \left(\frac{\eta\sigma}{\mu - \frac{\sigma^2}{2} - R}\right)^2 \quad (12)$$

Figure 5:
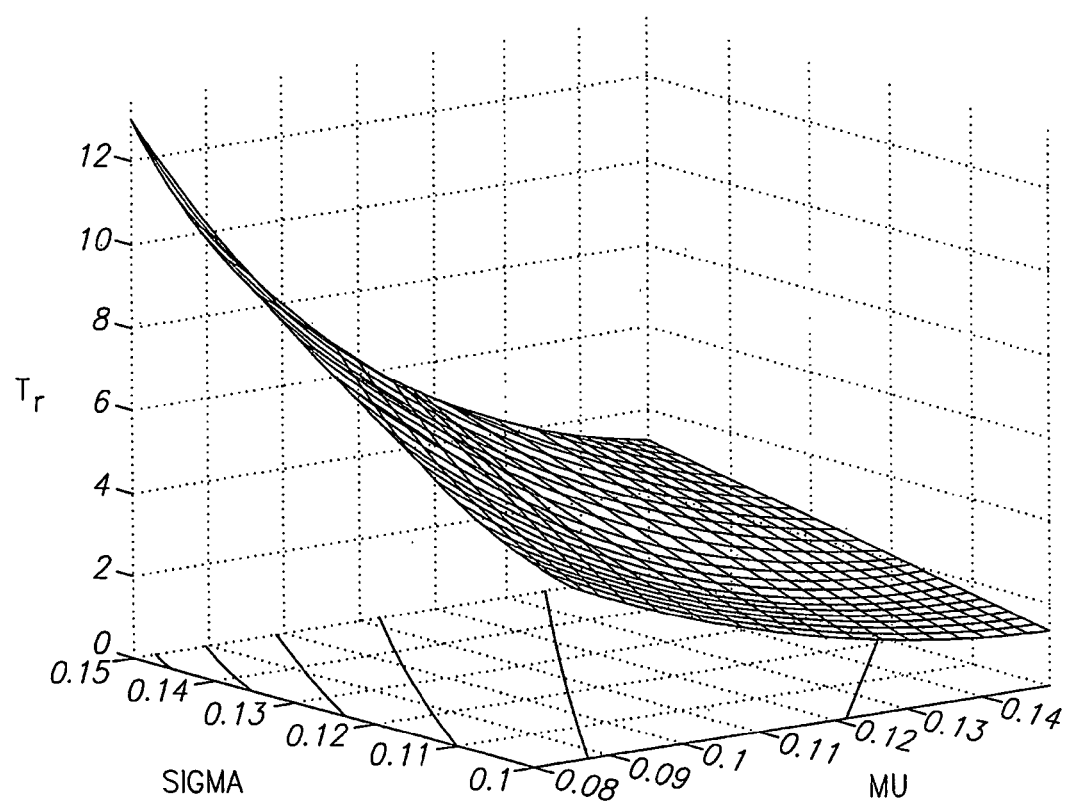
FIG. 5 is a graphic representation of the lower bound of the Recoupment Time for the investment as a function of μ and σ, to a confidence level of 95%.

The Recoupment Time, $T_r$, for the investment, to a confidence level of 95%, as a function of $\mu$ and $\sigma$, according to the model expressed in equation 1, is shown in FIG. 5.

Non-Parametrical Approach.

The second approach simulates the expected behavior of the Wealth function based on historical data for the value of an asset or portfolio. This non-parametrical simulation or bootstrapping, called so because behavior historical data for the function itself is used to generate the expected behavior, employs Monte Carlo resampling of historical price data for the asset. The simulation is used to generate estimated values for the parameters $T_r$, $V_m$, and $R_e$.

In this simulation, a time series of historical data is chosen and treated as a stochastic variable with an unknown distribution and functional behavior model. Taking a large number of sample data points from available historical data from some starting pointing in time, we calculate various percentile values of the wealth or value function for all time points. From these we can estimate expected values for our desired parameters $T_r$, $V_m$, and $R_e$.

As an example, we can consider the plentiful historical data for the Dow Jones Industrial Index. Taking historical weekly data for previous 8-10 years, samples of 1000 data points from different starting points in time are used to calculate various percentile values from the sample for all points in the time range. Empirical examination of the simulated functional behaviors suggest that the first percentile from the simulated distribution yields an estimate for the expected $V_m$, the fifth percentile from the simulated distribution yields an estimate for the expected $T_r$, and the fiftieth percentile from the simulated distribution yields an estimate for the expected $R_e$.

Figure 6A:
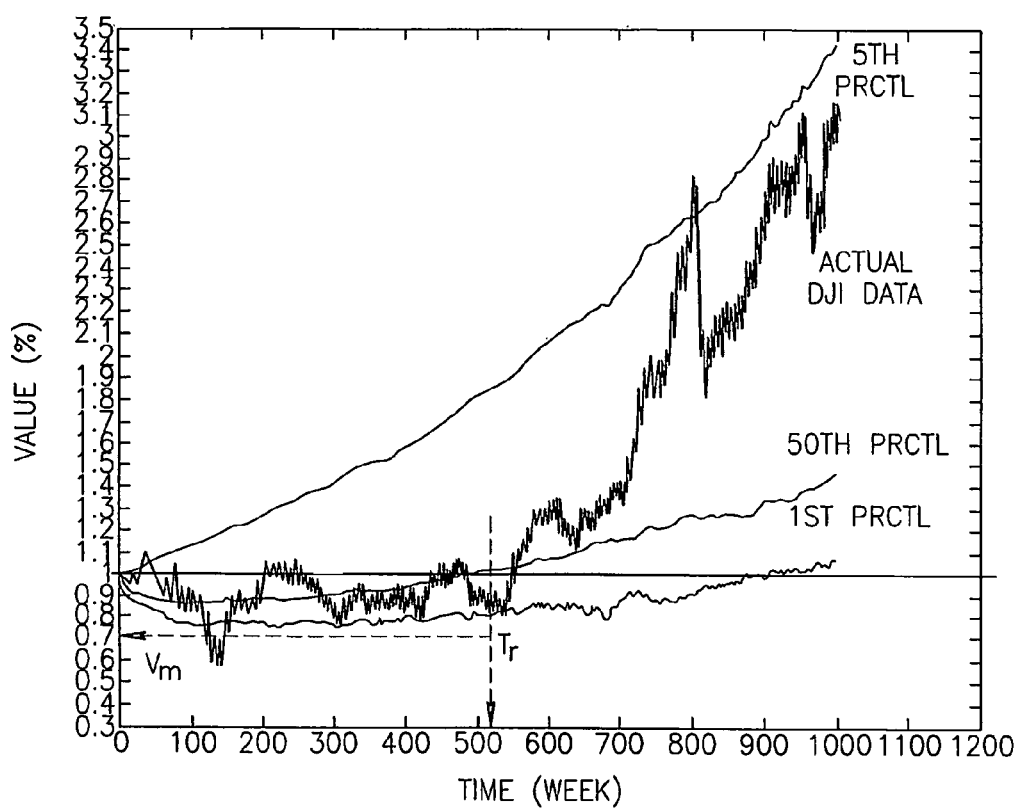
FIGS. 6A and 6B are graphic representations of Dow Jones Industrial Average data for different periods of 10 years together with simulated calculations.
Figure 6B:
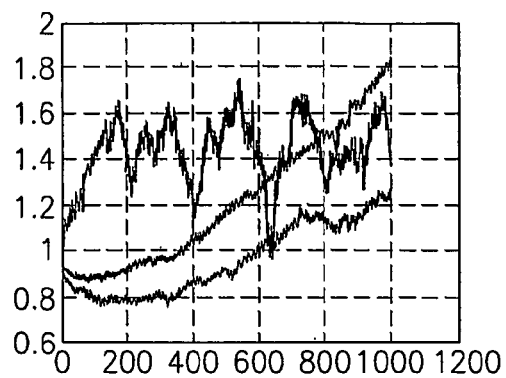
Figure 6B:
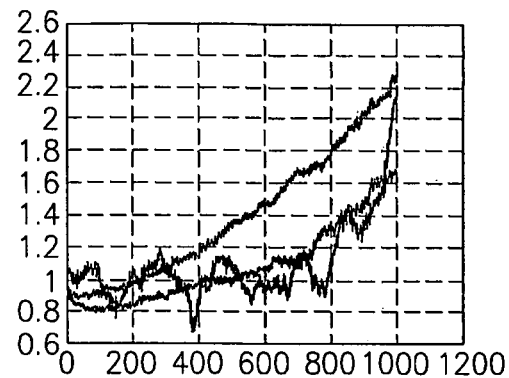
Figure 6B:
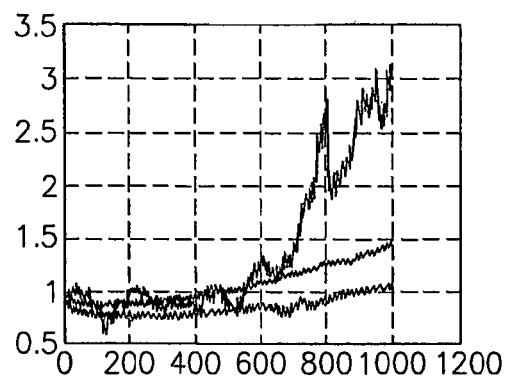
Figure 6B:
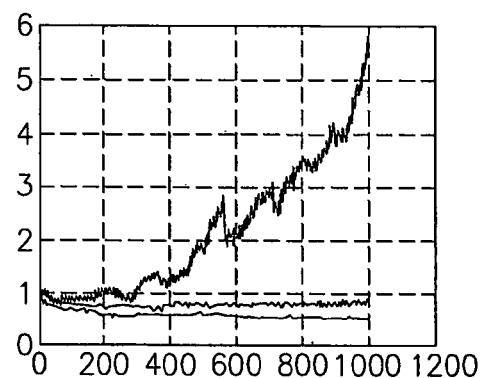

FIG. 6A is a graphical representation of historical Dow Jones Industrial Index data for a period of ten years from 1985 to 1995, together with simulated results calculated from ten years of historical data 1975 to 1985 showing $V_m$, $T_r$, and $R_e$ as the first, fifth, and fiftieth percentiles, respectively of the simulated distribution. FIG. 6B shows four graphical representations similar to that of FIG. 6A, for four different historical periods.

For the sake of comparison, we calculate the theoretical lower bound for the Dow Jones Industrial Index when fitted to the geometrical Brownian motion model, namely, equation 2, to determine $T_r$, $V_m$, and $R_e$. These are then compared to simulated plots of the first and fifth percentiles of the simulated distribution.

Figure 7A:
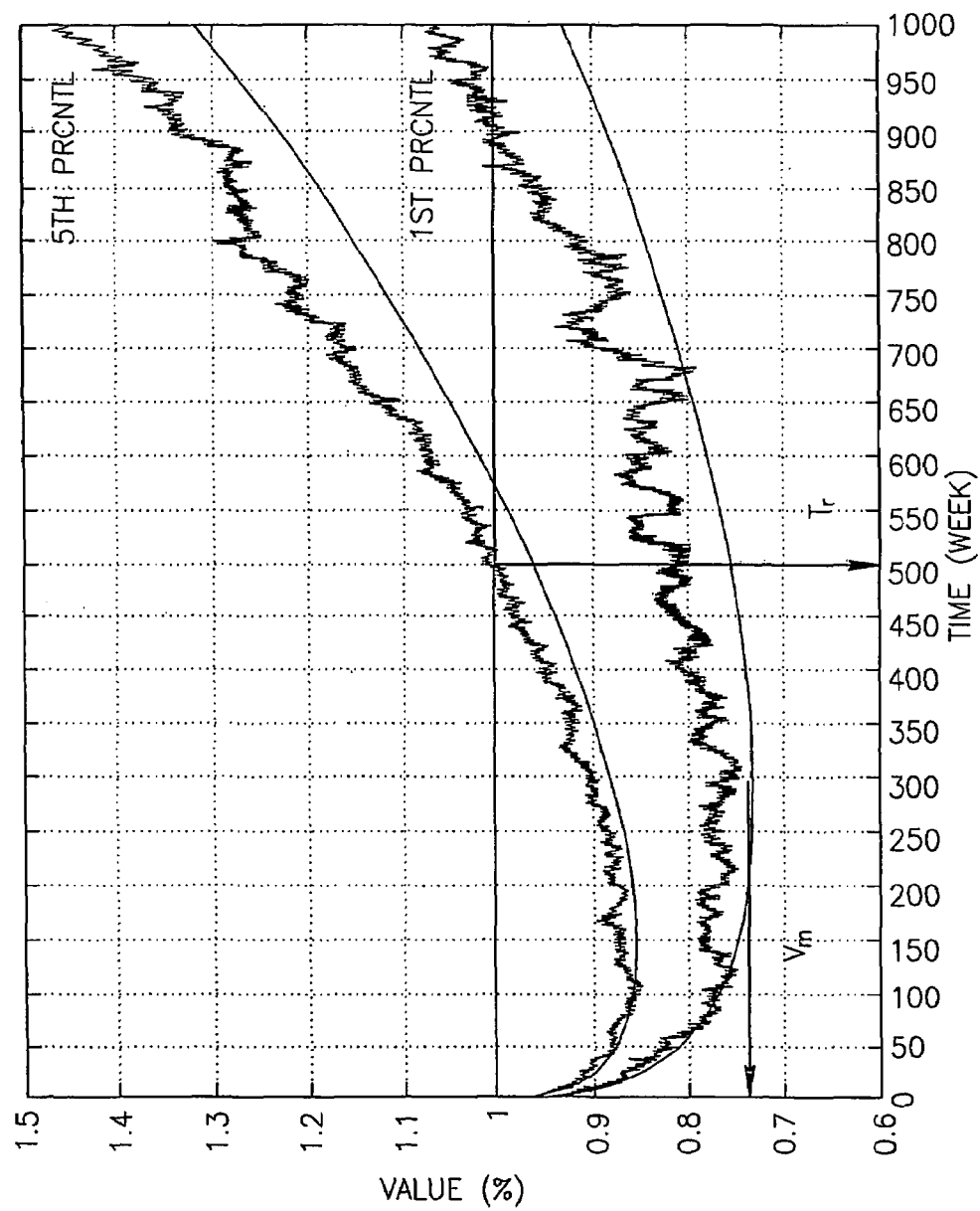
FIGS. 7A and 7B are graphic representations of simulated calculations of Dow Jones Industrial Average data for different periods of 10 years together with theoretical lower bound calculations.
Figure 7B:
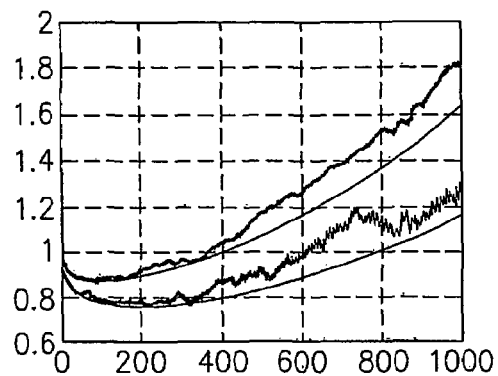
Figure 7B:
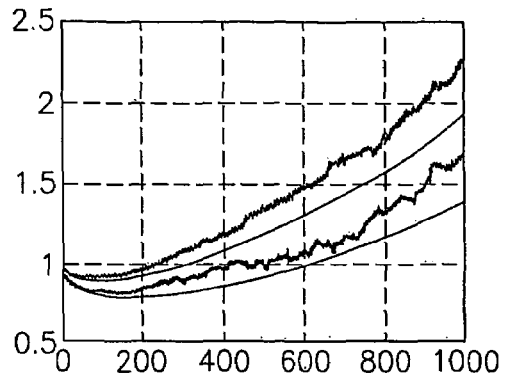
Figure 7B:
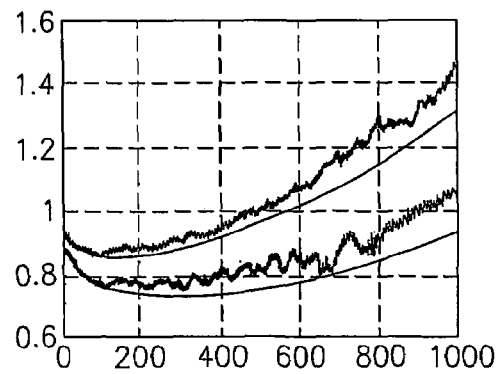
Figure 7B:
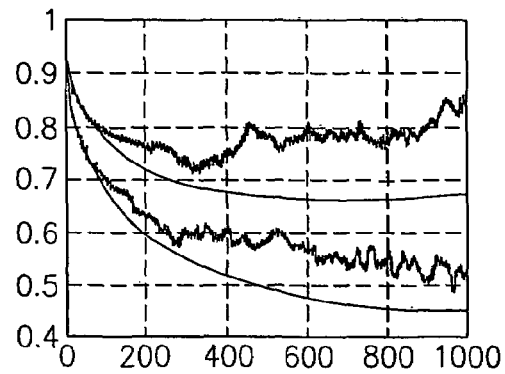

FIG. 7A is a graphical representation of the first and fifth percentile of simulated distributions of the Dow Jones Industrial Index based on ten years of historical data 1975 to 1985 together with the corresponding theoretical lower bounds at the 99% and 95% levels for the expected value of the index according to the geometrical Brownian motion model, i.e., equation 2. FIG. 7B shows four graphical representations similar to that of FIG. 7A, for four different historical periods.

Now that we have developed the tools to evaluate and optimize investments, we can formulate the investor's Portfolio Optimization problem based on the now known characteristics of the investor's Utility function.

Consider the investor's Utility function, $U(R_e, V_m, T_r)$, which, it should now be clear, is suitable for characterizing any kind of investment product or asset, from real estate or antiques and other collectibles, to fixed income instruments, equities, and derivatives.

The goal of Portfolio Optimization is to maximize the expected return, $R_e$, subject to constraints derived from the investor's preferences, the investor's maximum time to achieve the desired return or the investment horizon, $T_{max}$, and minimum allowed or tolerated investment value, $V_m$, namely:

$$\max U(T_r, V_v, R_e) = \begin{cases} \operatorname{argmax} \ldots R_e \\ (R_e \subset ER) \\ T_r \leq T_{max} \\ V_m \geq V_{min} \end{cases}$$

Where ER is a reachable set of returns or yields, as a combination of investment assets or instruments available to the investor.

Using the results developed hereinabove, the Portfolio Optimization problem can be restated in terms of $\mu$, $\sigma$, $T_{max}$—the maximum time consistent with the investor recoupment time, $V_{min}$,—the minimum allowed or tolerated investment value or balance, and R—the prevailing risk-less rate of return. By performing this optimization, we determine find a best possible pair $(\mu, \sigma)$ from any set of investments actually available to the investor. The restated Portfolio Optimization problem can be expressed as follows:

$$\max U(T_r, V_m, R_e) = \begin{cases} \operatorname{argmax}\left(\mu - \dfrac{\sigma^2}{2}\right) \\ \dfrac{4\eta^2 \sigma^2}{(2\mu - \sigma^2 + 2R)^2} \leq T_{max} \\ e^{\left[\left(\mu - \frac{\sigma^2}{2}\right)\frac{\eta^2 \sigma^2}{(2\mu - \sigma^2)^2} - \eta\sigma\left(\frac{\eta^2 \sigma^2}{(2\mu - \sigma^2)^2}\right)^{\frac{1}{2}}\right]} \geq V_{min} \end{cases}$$

Figure 8:
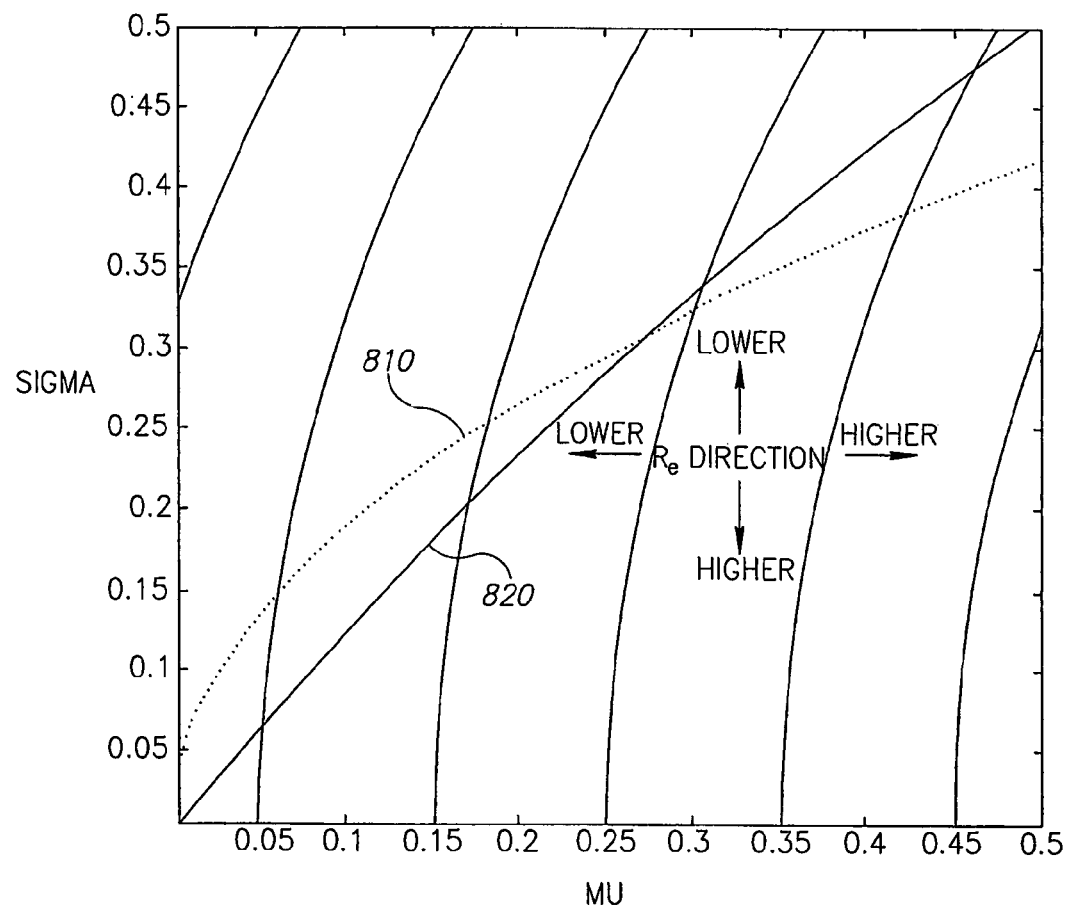
FIG. 8 is a graphical representation of portfolios as a function of the standard mu and sigma. (μ, σ) for $T_{max} \leq 5$ years and $V_{min} \geq 75\%$.

For example, taking a confidence level of 95% and a base, risk-less, interest rate of 1%, we have $\eta=1.65$ and R=1%. For an investor whose risk profile includes a maximum allowed recoupment time, $T_{max}$, equal or less than 5 years and a minimum allowed account balance, $V_{min}$, no less than 75% of the initial investment we can find a set of points corresponding to portfolios that satisfy the investor's criteria. Referring now to FIG. 8, there is shown a graphical representation of portfolios as a function of the standard mu and sigma. ($\mu$, $\sigma$). The points under the dotted line 810 satisfy the investor criterion of $T_{max} \leq 5$ years and the points under the solid line 820 satisfy the investor criterion of $V_{min} \geq 75\%$. All the points under both curves will then satisfy both criteria and would be considered suitable investments for the investor.

As a further example, consider a set of three artificial investment assets with respective expected returns:

$\mu_1 = 0.1$
$\mu_2 = 0.2$
$\mu_3 = 0.15$

The optimization problem to solve is to find a suitable portfolio, namely to assign each investment asset is a predetermined fraction of the portfolio in order to meet the investor's criteria.

The covariance matrix of the set of investment assets is:

| cov | A1 | A2 | A3 |
|---|---|---|---|
| A1 | 0.01 | −0.02 | 0.008 |
| A2 | −0.02 | 0.08 | −0.004 |
| A3 | 0.008 | −0.004 | 0.046 |

Figure 9:
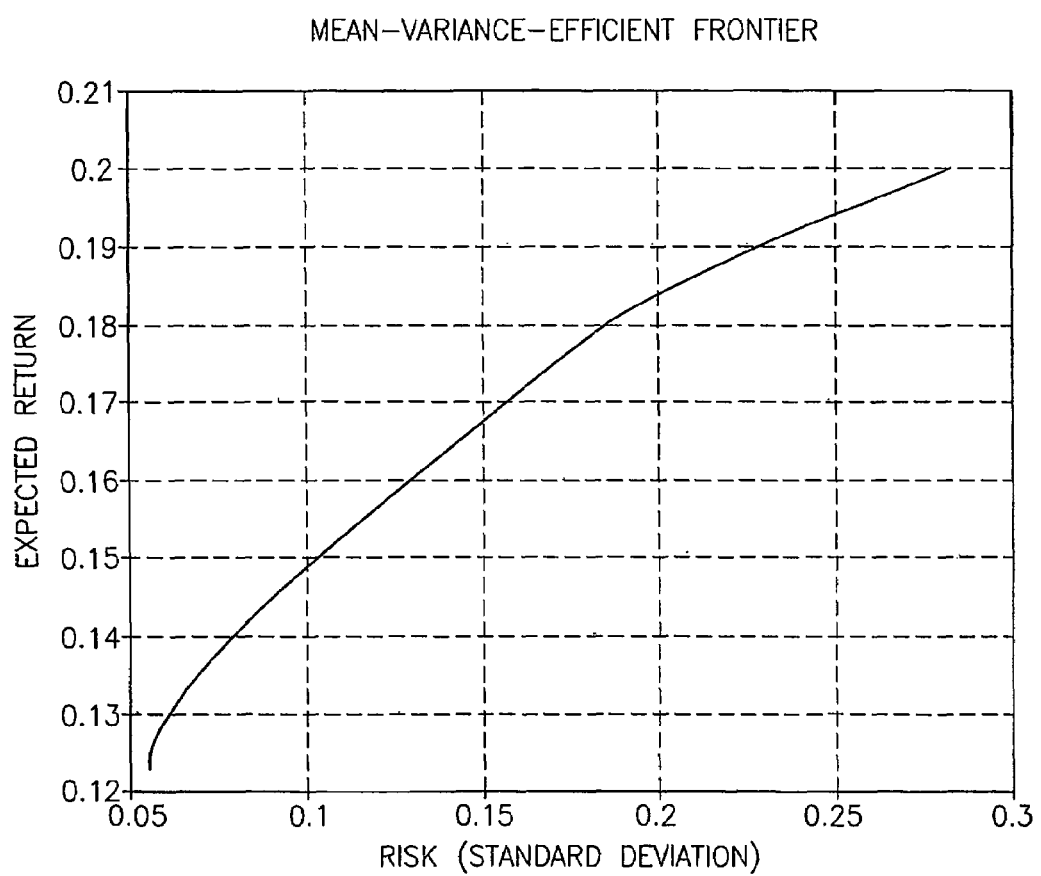
FIG. 9 is a graphical representation of the mean variance efficient frontier for portfolios constructed from three hypothetical assets.

As is known, the diagonal terms of this matrix are the standard deviations, $\sigma$, of the individual investment assets. Consider the efficient portfolios of Markovitz, described hereinabove, namely, the set of points corresponding to portfolios of maximum $\mu$ and minimum $\sigma$. The efficient frontier values are those portfolios representing the edge or boundary of those for which will have a lower $\sigma$ for the same $\mu$ or a higher $\mu$ for the same $\sigma$. The graph in FIG. 9 represents the mean variance efficient frontier for portfolios constructed from the three hypothetical assets defined above.

Figure 10:
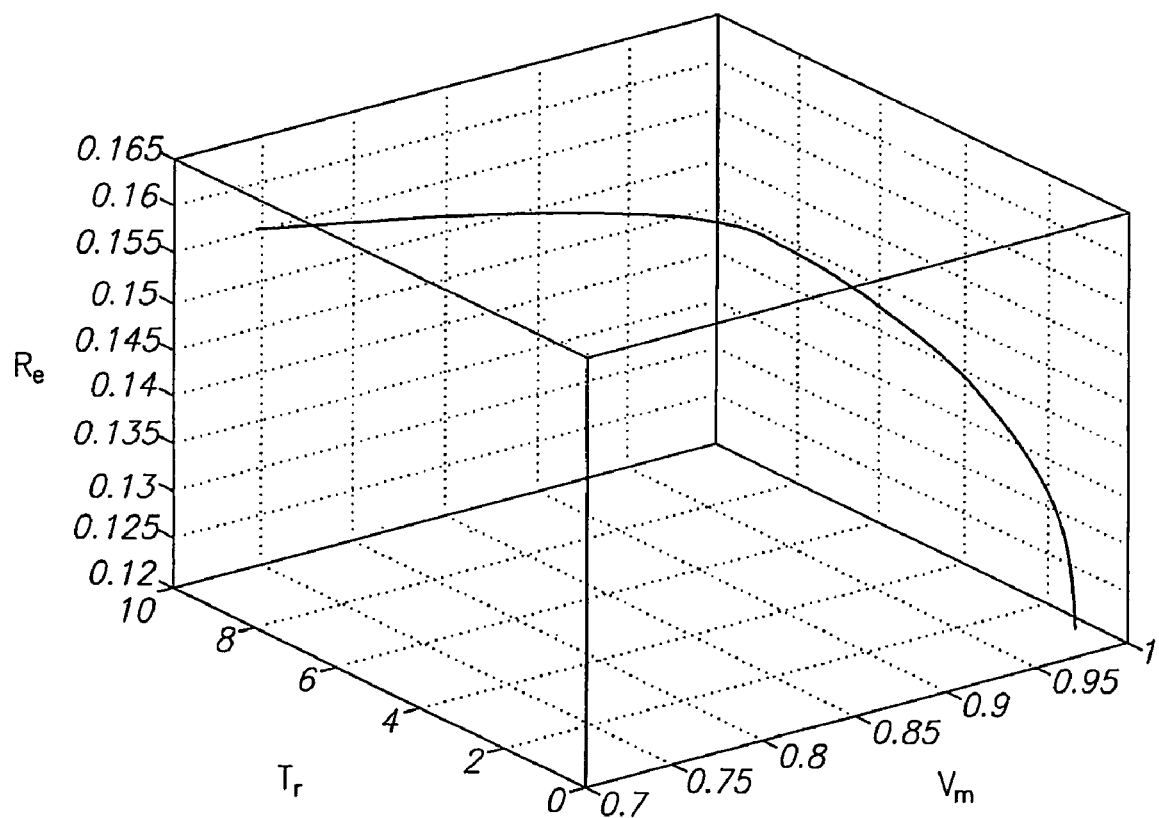
FIG. 10 is a graphical representation of the mean variance frontier portfolios of FIG. 9 plotted in the space of $R_e$ vs. $T_r$ and $V_m$.
Figure 11:
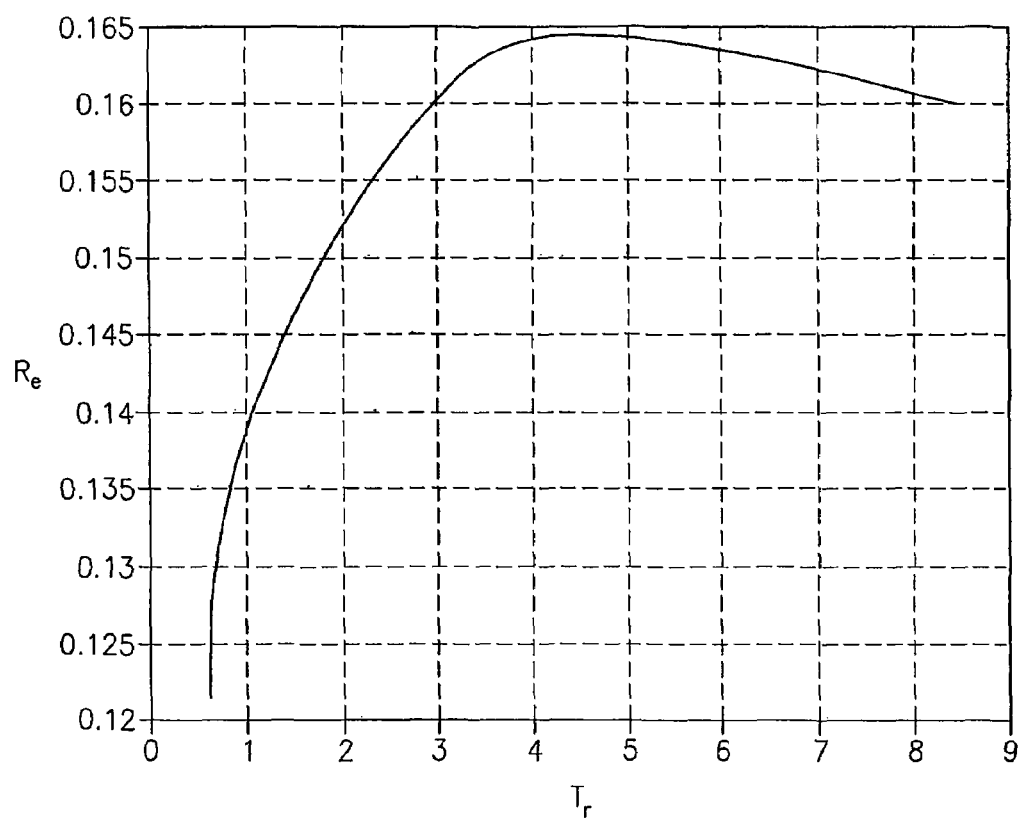
FIG. 11 is a graphical representation of the expected return, $R_e$, of the portfolios of FIG. 10, as a function of $T_r$.
Figure 12:
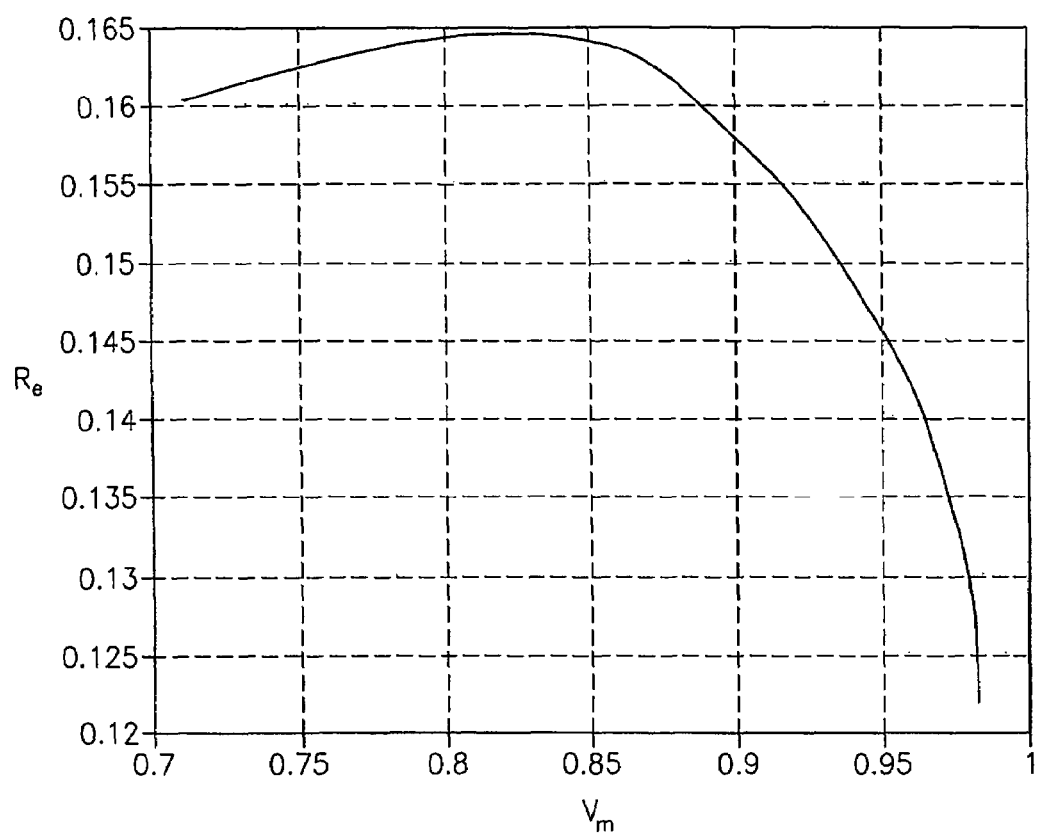
FIG. 12 is a graphical representation of the expected return, $R_e$, of the portfolios of FIG. 10, as a function of $V_m$.

Using the model of the present invention, we can take these efficient portfolios and calculate $T_r$, $V_m$, and $R_e$ for these portfolios. FIG. 10 shows these mean variance frontier portfolios plotted in the space of $R_e$ vs. $T_r$ and $V_m$. It is instructive to look at the expected return, $R_e$, as a function of $T_r$, as shown in FIG. 11 and $R_e$ as a function of $V_m$, as shown in FIG. 12. In both cases, the expected return, $R_e$, reaches a maximum value even as risk, represented by $T_r$ and $V_m$ increases. This seems to go against conventional investor wisdom that there is some ongoing monotonic relation between risk and reward; namely, the potential reward of an investment continues to increase with increased investment risk.

Using the characterization of the investor Utility function presented hereinabove, it is possible for an investor either to evaluate the suitability of a portfolio in light of or to choose a portfolio matched to that investor's risk tolerance and reward expectation by means of the parameters $T_r$, $V_m$, and $R_e$, further including any other constraints or limitations on suitable types of investment assets the investor may have. For the purpose of portfolio optimization, an investment portfolio is a set of specific investment assets from a set of types of investment assets, wherein each of the specific investment assets makes up a definite fraction of the portfolio.

Figure 13:
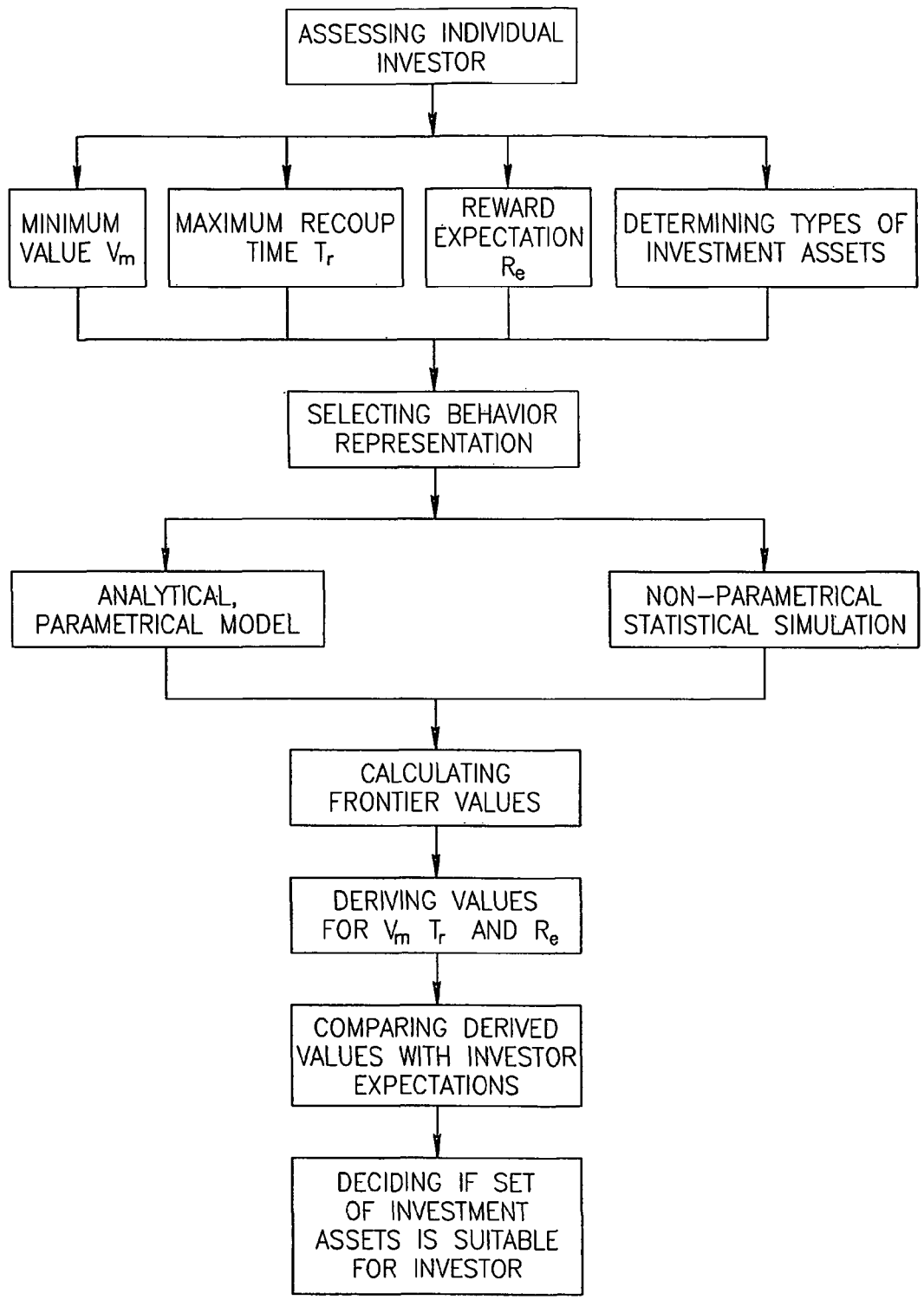
FIG. 13 is a flow chart for a method for evaluating the suitability of a set of investment assets for an individual investor, in accordance with a preferred embodiment of the present invention.

Accordingly, the present invention includes a method for evaluating the suitability of a set of investment assets for an individual investor, a flow chart for which is shown in FIG. 13, including the steps of:

assessing an individual investor's risk tolerance;

representing the risk tolerance in the form of two risk tolerance parameters, which are, as discussed hereinabove: the minimum tolerated value of the individual investor's investment and the maximum allowed time to recoup the individual investor's investment;

obtaining the individual investor's reward expectation, which is, as discussed hereinabove: the expected rate of return on the individual investor's investment;

determining types of investment assets the individual investor wishes to consider; selecting a representation for the behavior of the considered types of investment assets, which is either a theoretical, parametrical model based on geometrical Brownian motion of prices of investment assets or a non-parametrical statistical simulation based on statistically processed historical data for the prices of investment assets;

calculating statistically viable frontier values of $T_r$, $V_m$, and $R_e$ of the specific investment assets based on the selected representation;

deriving values for $T_r$, $V_m$, and $R_e$ for a set of investment assets from the statistically viable frontier values of $T_r$, $V_m$, and $R_e$ of the specific investment assets;

comparing the derived values for said risk tolerance parameters with those representing the individual investor's risk tolerance and the derived value for the reward expectation with the individual investor's reward expectation; and deciding if the set of investment assets is suitable for the individual investor.

Now that we have provided a method for the investor to evaluate a portfolio, based on the Utility function, and have further provided a method to construct a portfolio wherein the Utility function is maximized, we can address the problem of constructing an optimal portfolio for the individual investor from a set of investment asset types and the investment assets included therein which are actually available to the investor.

In considering all the variables which can influence performance of an investment, they can be divided into two classes:

Endogenous, which are asset specific or fundamental, such as market capitalization for stocks or term of investment for fixed income instruments; and exogenous variables, which are environmental or based on the prevailing economic state or climate, such as domestic productivity level or unemployment level.

In formulating the mathematical problem, the set of exogenous variables will be understood to define the economic state and the set of endogenous variables will be used to form asset classes from the available set of securities or investment assets.

It should be noted that, while for portfolio evaluation as developed hereinabove, two alternative representations of investment behavior were considered: the analytical model and the simulation; for the present optimization problem, simulation is not a viable alternative, as the required computations become exceedingly unwieldy. Therefore, the investment behavior will be described using the Markov stochastic game abstraction.

If $A_i$ is a particular asset class or investment strategy, $S_j$ is an economic state, and $q_j$ is the probability of economic state of $S_j$ occurring, then $U_{ij}$ is the utility of holding/applying $A_i$ under $S_j$. We can express the results of the investment as the following matrix of outcomes:

Matrix of Outcomes

| $\frac{ecomic\ state}{asset/strategy}$ | $S_1$ | ... | $S_n$ |
|---|---|---|---|
| $A_1$ | $U_{11}q_1$ | ... | $U_{1n}q_n$ |
| ⋮ | ⋮ | ⋱ | ⋮ |
| $A_m$ | $U_{m1}q_1$ | ... | $U_{mn}q_n$ |

If the transition from one economic state to another has an associated probability, the transition matrix for this change can be expressed as:

Transition Matrix

| Economic State | $S_1$ | ... | $S_n$ |
|---|---|---|---|
| $S_1$ | $Q_{11}$ | ... | $Q_{1n}$ |
| ⋮ | ⋮ | ⋱ | ⋮ |
| $S_n$ | $Q_{n1}$ | ... | $Q_{nn}$ |

Then, the solution to this "game" is a vector $\vec{P}(p_1, p_2, \ldots, p_m)$, where $p_i$ is the weight of the specific securities of or strategies, $A_i$, in the portfolio such that the resulting portfolio will satisfy the conditions of the optimization problem:

$$\max U(\eta, R_e, T_r, V_v) = \begin{cases} \text{argmax}(R_e \subset E(R)) \\ T_r \leq T_{max} \\ V_m \geq V_{min} \end{cases}$$

It should be noted that the resulting portfolio, and hence, the vector $\vec{P}(p_1, p_2, \ldots, p_m)$ must satisfy legal and practical conditions, such as the legally allowed or investor tolerated amount of leverage employed in formulating the portfolio.

The mathematical problem is formulated with the following series of vectors and matrices:

1. Economic Probability Vector, $\vec{q}_{[n \times 1]}$

Each element of vector $q_j$ is a probability for the certain economic state $S_j$ to occur, where n is the number of states.

We have to build some kind of Markov Chain or Bayesian Network for calculating transition matrix and $\vec{q}$ (for example as absorbing state). In the case where all economic states are equally likely we may use the known Laplace criterion $$q_1 = q_2 = \ldots = q_n = \frac{1}{n}.$$

In other cases, we may use the known criteria of Wald, Hurwitz, or Savage.

2. Portfolio Probability Vector, $\vec{p}_{[m \times 1]}$

Each element of vector $p_i$ is a probability (in terms of mixed game equilibrium) of applying the i-th pure strategy or in terms of asset allocation proportion of i-th asset in the final portfolio, where m is the number of assets. The solution to the "game" equation above provides the result for $\vec{P}$.

3. Assets Matrix, $M_{[m \times n]}$

The elements of this matrix are state-conditional expected returns $\mu$ for the given class of assets (or strategy) $A_i$ with respect to the different economic states $S_k$:

$$\mu_{ik} = E(\mu_i \mid S_k)$$

$$\begin{bmatrix} & S_1 & \cdots & S_n \\ A_1 & \mu_{11} & \cdots & \mu_{1n} \\ \vdots & \vdots & \ddots & \vdots \\ A_m & \mu_{m1} & \cdots & \mu_{mn} \end{bmatrix} \to M = \begin{bmatrix} \mu_{11} & \cdots & \mu_{1n} \\ \vdots & \ddots & \vdots \\ \mu_{m1} & \cdots & \mu_{mn} \end{bmatrix}$$

The columns of this matrix are m-asset portfolios associated with the different economic states $S_k$. We can write for k-th portfolio, $$\mu_k = \sum_{i=1}^{m} \mu_i p_i$$

where $p_i$ is a the proportion of asset $A_i$ in the portfolio or (in terms of Nash equilibrium for mixed strategy) the probability to apply pure investment strategy $A_i$.

The final portfolio is a sum of k-th portfolio multiplied by probability of the k-th economic state $q_k$:

$$\mu = \sum_{k=1}^{n} \mu_k q_k = \sum_{k=1}^{n} \sum_{l=1}^{m} \mu_{ik} q_k p_l = \vec{p} \times M \times \vec{q}.$$

4. Variance-Covariance Matrix, $C_{[m \times m \times n]}$

The Variance-covariance assets matrix is a 3-dimensional matrix or an S-vector of 2 dimensional state conditional Variance-covariance matrices. Each element of this matrix $cv_{ij}^{k}$ is a state-conditional covariance $cov(A_i, A_j \mid S_k)$ for the k-th state, $S_k$ covariance matrix would be:

economic state $S_k$ $$\begin{bmatrix} & A_1 & \cdots & A_m \\ A_1 & cov_{11(k)} & \cdots & cov_{m1(k)} \\ \vdots & \vdots & \ddots & \vdots \\ A_m & cov_{m1(k)} & \cdots & cov_{mn(k)} \end{bmatrix} \to C_{[m \times m \times k]} = \begin{bmatrix} cov_{11(k)} & \cdots & cov_{m1(k)} \\ \vdots & \ddots & \vdots \\ cov_{m1(k)} & \cdots & cov_{mm(k)} \end{bmatrix}.$$

5. Portfolio Matrix, $B_{[m \times n]}$

Each element of this matrix is a state-conditional variance for the given class of assets (or strategy) $A_i$ with respect to the different economic states $S_k$, multiplied by proportion of this asset in the k-th portfolio. Thus, the elements of this matrix are:

$$b_{ik} = \sum_{j=1}^{m} p_j cv_{ij}^{k}$$

-continued $$\begin{array}{c|ccc} \text{economic state} & & & \\ \hline \text{asset/strategy} & S_1 & \cdots & S_n \\ A_1 & b_{11} & \cdots & b_{1n} \\ \vdots & \vdots & \ddots & \vdots \\ A_m & b_{m1} & \cdots & b_{mn} \end{array} \to B_{[m \times n]} = \begin{bmatrix} b_{11} & \cdots & b_{1n} \\ \vdots & \ddots & \vdots \\ b_{m1} & \cdots & b_{mn} \end{bmatrix}.$$

The columns of this matrix are m-asset portfolios associated with the different economic states, $S_k$, and the variance of such portfolios, $\sigma_k^2$, is equal to the sum of asset's variances with respect to their covariance $cov_{ij(k)}$.

$$\sigma_k^2 = \sum_{i=1}^{m} \sum_{j=1}^{m} p_i p_j cov_{ij(k)} \Rightarrow \sigma^2$$

$$= \sum_{k=1}^{n} \sum_{i=1}^{m} q_k \left( \sum_{j=1}^{m} p_j p_i cov_{ij(k)} \right)$$

$$= \vec{P}' \times \left( \sum_{k=1}^{n} C_k q_k \right) \times \vec{P}$$

From the above matrices we may conclude that the expected return, $\mu$, of the final portfolio is equal to:

$$\mu = \vec{p}\,' \times M \times \vec{q},$$

and the variance, $\sigma^2$, is equal to:

$$\sigma^2 = \vec{p}\,' \times \left( \sum_{k=1}^{n} C_k q_k \right) \times \vec{p}.$$

In order to optimize the Investment Portfolio, we have to maximize the outcome from matrix $M_{[m \times n]}$ and minimize the outcome from $B_{[m \times n]}$ at the same time subject to certain criteria and restrictions or, taking the results explained hereinabove, we consider the behavior of stock as geometric Brownian motion, so that we need to find argmax $(2\mu - \sigma^2)$.

Thus, the optimization problem can be expressed by:

$$\max U(T_r, V_m, R_e) = \begin{cases} \text{argmax}\left(\mu - \dfrac{\sigma^2}{2}\right) \\ \dfrac{4\eta^2 \sigma^2}{(2\mu - \sigma^2 - 2R)^2} \leq T_{max} \\ e^{\left[\left(\mu - \frac{\sigma^2}{2}\right) \frac{\eta^2 \sigma^2}{(2\mu - \sigma^2)^2} - \eta \sigma \left(\frac{\eta^2 \sigma^2}{(2\mu - \sigma^2)^2}\right)^{\frac{1}{2}}\right]} \geq V_{min} \end{cases}$$

where $$\mu = \vec{P}\,' \times M \times \vec{q}$$

$$\sigma^2 = \vec{P}\,' \times \left( \sum_{k=1}^{n} C_k q_k \right) \times \vec{P}$$

By resolving this optimization, we find the vector $\vec{p}_{[m \times 1]}$ that will optimize the investor's portfolios from the set of securities and strategies actually available for the investor, thereby maximizing the expected return, $R_e$, in keeping with the investor's constraints and risk tolerance, as characterized by the investment horizon, $T_{max}$, and the minimum allowed value, $V_{min}$.

Accordingly, the present invention further includes a method for evaluating choosing an investment portfolio, which is a set of preselected investment assets from a set of types of investment assets, wherein each preselected investment asset is a predetermined fraction of the portfolio for an individual investor from the preselected set of types of investment assets, including the steps of:

assessing an individual investor's risk tolerance;

representing the risk tolerance in the form of two risk tolerance parameters, namely: the minimum tolerated value of the individual investor's investment and the maximum allowed time to recoup the individual investor's investment;

obtaining the individual investor's reward expectation, namely: the expected rate of return on the individual investor's investment;

determining types of investment assets the individual investor wishes to consider;

selecting a representation for the behavior of the considered types of investment assets, namely, a theoretical, parametrical model based on geometrical Brownian motion of prices of investment assets;

calculating statistically viable frontier values of the risk tolerance parameters and the reward expectations of the specific investment assets based on the selected representation;

generating a multiplicity of portfolios of investment assets from the considered types of investment assets, possibly including portfolios employing leverage;

deriving values for the risk tolerance parameters and the reward expectation for the multiplicity of portfolios of investment assets from the statistically viable frontier values of the risk tolerance parameters and the reward expectations of the specific investment assets;

formulating an optimization problem, which may include weighting to account for the general economic climate, over the multiplicity of portfolios of investment assets, possibly further including weighting to account for preselected fundamental parameters thereof, of the comparison of the derived values for the risk tolerance parameters of the multiplicity of portfolios of investment assets with those representing the individual investor's risk tolerance and the statistically viable frontier values of the reward expectations of the multiplicity of portfolios of investment assets with the individual investor's reward expectation;

comparing the derived values for the risk tolerance parameters with those representing the individual investor's risk tolerance and the derived value for the reward expectation of the portfolio with the individual investor's reward expectation; and solving the optimization problem to recommend an optimized portfolio of investment assets to the individual investor.

Thus the methodologies developed hereinabove can be employed to provide a number of valuable advisory services to professional and individual investors. It should be noted that the present invention further includes an arrangement to provide advisory services to the community of investors over the Internet, via a suitable web interface, including a system to collect the relevant data from each individual investor, such as online questionnaires, and to automatically collect the required data about different investment assets.

In particular, these services fall into three categories:

Evaluation and comparison of risk and reward for arbitrary investments and portfolios;

Searching for investment assets, portfolios, and strategies according to investor preferences; and Construction and management of investment portfolios, according to investor's preferences and constraints.

It will further be appreciated, by persons skilled in the art that the scope of the present invention is not limited by what has been specifically shown and described hereinabove, merely by way of example. Rather, the scope of the present invention is defined solely by the claims, which follow.

The invention claimed is:

1. A method for evaluating the suitability of a set of investment assets for an individual investor, including the steps of:
   assessing an individual investor's risk tolerance;
   representing said risk tolerance in the form of two risk tolerance parameters;
   obtaining the individual investor's reward expectation;
   determining types of investment assets the individual investor wishes to consider;
   selecting a representation for the behavior of the considered types of investment assets;
   calculating statistically viable frontier values of said risk tolerance parameters and said reward expectations of the investment assets based on said selected representation;
   deriving values for said risk tolerance parameters and said reward expectation for a set of investment assets from said statistically viable frontier values of said risk tolerance parameters and said reward expectations of the investment assets;
   comparing said derived values for said risk tolerance parameters with those representing the individual investor's risk tolerance and said derived value for said reward expectation with the individual investor's reward expectation; and
   deciding if the set of investment assets is suitable for the individual investor.

2. The method according to claim 1, wherein, in said step of representing, said risk tolerance parameters are the minimum tolerated value of the individual investor's investment and the maximum allowed time to recoup the individual investor's investment.

3. The method according to claim 1, wherein, in said step of obtaining, said reward expectation is the expected rate of return on the individual investor's investment.

4. The method according to claim 1, wherein, in said step of selecting, said representation of behavior is one of: a theoretical model and statistically processed historical data.

5. The method according to claim 4, wherein said theoretical model is a parametrical model based on geometrical Brownian motion of prices of investment assets.

6. The method according to claim 4, wherein said statistically processed historical data is a non-parametrical statistical simulation based on historical data for the prices of investment assets.

7. The method according to claim 6, wherein said statistical simulation is generating a distribution of a time series of historical data for the prices of investment assets as a stochastic variable with an unknown distribution.

8. The method according to claim 7, wherein, in said generated distribution, a predetermined initial percentile of said generated distribution is said minimum tolerated value of the individual investor's investment, a predetermined second percentile of said generated distribution is said maximum allowed time to recoup the individual investor's investment, and a predetermined third percentile of said generated distribution is said expected rate of return on the individual investor's investment.

9. The method according to claim 8, wherein, in said generated distribution, said predetermined initial percentile, corresponding to said minimum tolerated value of the individual investor's investment, is the first percentile of said generated distribution.

10. The method according to claim 8, wherein, in said generated distribution, said predetermined second percentile, corresponding to said maximum allowed time to recoup the individual investor's investment, is the fifth percentile of said generated distribution.

11. The method according to claim 8, wherein, in said generated distribution, said predetermined third percentile, corresponding to said expected rate of return on the individual investor's investment, is the fiftieth percentile of said generated distribution.

12. A method of choosing an investment portfolio for an individual investor from a preselected set of types of investment assets, including the steps of:
    assessing an individual investors risk tolerance;
    representing said risk tolerance in the form of two risk tolerance parameters;
    obtaining the individual investor's reward expectation;
    determining types of investment assets the individual investor wishes to consider;
    selecting a representation for the behavior of the considered types of investment assets;
    calculating statistically viable frontier values of said risk tolerance parameters and said reward expectations of the investment assets based on said selected representation;
    generating a multiplicity of portfolios of investment assets from the considered types of investment assets;
    deriving values for said risk tolerance parameters and said reward expectation for said multiplicity of portfolios of investment assets from said statistically viable frontier values of said risk tolerance parameters and said reward expectations of the investment assets;
    formulating an optimization problem over said multiplicity of portfolios of investment assets of the comparison of said derived values for said risk tolerance parameters of said multiplicity of portfolios of investment assets with those representing the individual investor's risk tolerance and said statistically viable frontier values of said reward expectations of said multiplicity of portfolios of investment assets with the individual investor's reward expectation;
    comparing said derived values for said risk tolerance parameters with those representing the individual investor's risk tolerance and said derived value of said reward expectation of said portfolio with the individual investor's reward expectation; and
    solving said optimization problem to recommend an optimized portfolio of investment assets to the individual investor,
    wherein, for a preselected set of types of investment assets, a portfolio is a set of preselected investment assets from said set of types of investment assets, wherein each said preselected investment asset is a predetermined fraction of said portfolio.

13. The method according to claim 12, wherein, in said step of representing, said risk tolerance parameters are the minimum tolerated value of the individual investor's investment and the maximum allowed time to recoup the individual investor's investment.

14. The method according to claim 12, wherein, in said step of obtaining, said reward expectation is the expected rate of return on the individual investor's investment.

15. The method according to claim 12, wherein, in said step of selecting, said representation of behavior is a theoretical model.

16. The method according to claim 15, wherein said theoretical model is a parametrical model based on geometrical Brownian motion of prices of investment assets.

17. The method according to claim 12, wherein said step of formulating includes weighting said optimization problem to include the general economic climate.

18. The method according to claim 12, wherein said step of formulating includes weighting said optimization problem to include preselected fundamental parameters of said set of preselected investment assets from said set of types of investment assets.

19. The method according to claim 12, wherein said step of generating a multiplicity of portfolios includes portfolios employing leverage.

20. An investor advisory service employing the method of claim 1 to evaluate the suitability of investments for individual investors according to their risk tolerance and reward expectations, including:
    data processing apparatus to implement said method; and
    a communication system to allow exchange of information with the individual investor.

21. An investor advisory service employing the method of claim 12 to construct investment portfolios suited to individual investors according to their risk tolerance and reward expectations, including:
    data processing apparatus to implement said method; and
    a communication system to allow exchange of information with the individual investor.

* * * * *